(No Model.)
J. W. VAUGHN.
VEHICLE AXLE.
No. 489,577. Patented Jan. 10, 1893.
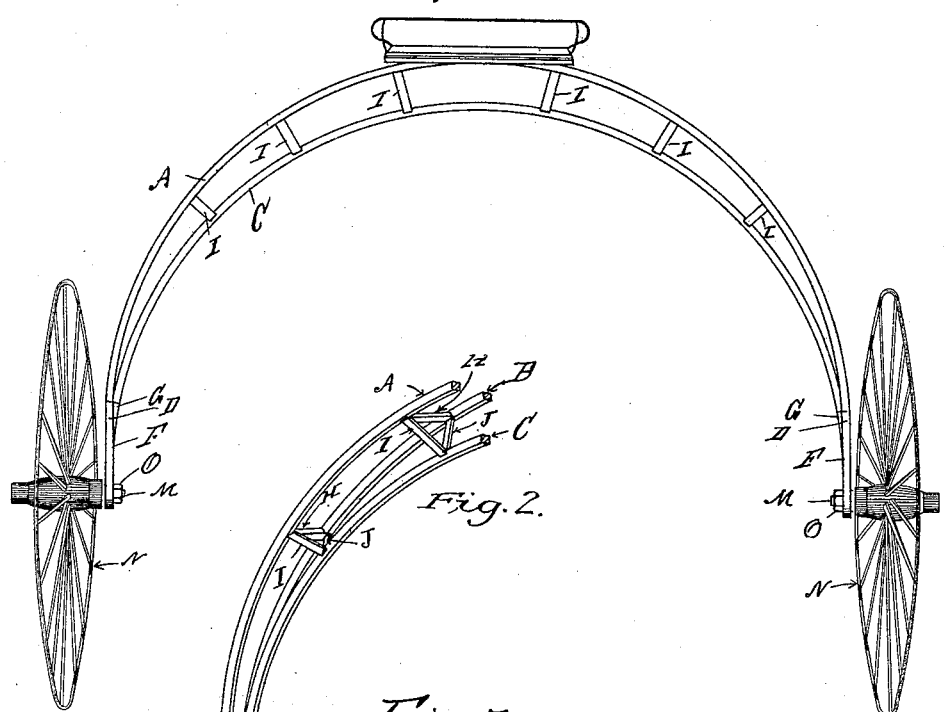
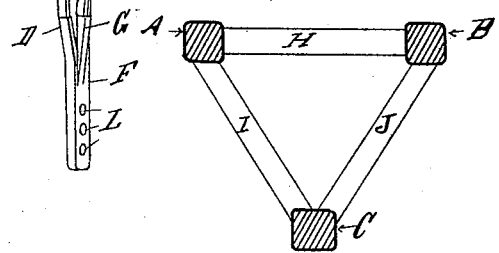
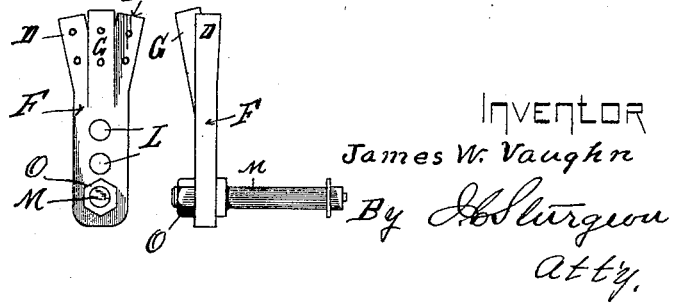
WITNESSES
F. Einfeldt.
A. L. Jackson.
INVENTOR
James W. Vaughn
By J. Sturgeon
Atty.

UNITED STATES PATENT OFFICE.

JAMES W. VAUGHN, OF GREENVILLE, PENNSYLVANIA.

VEHICLE-AXLE.

SPECIFICATION forming part of Letters Patent No. 489,577, dated January 10, 1893.

Application filed August 15, 1892. Serial No. 443,129. (No model.)

*To all whom it may concern:*

Be it known that I, JAMES W. VAUGHN, a citizen of the United States, residing at Greenville, in the county of Mercer and State of Pennsylvania, have invented certain new and useful Improvements in Vehicle-Axles; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the invention in vehicle axles hereinafter set forth and explained, and illustrated in the accompanying drawings in which:

Figure 1. is a view in elevation of my improved vehicle axle. Fig. 2. is a perspective view of a section of the same. Figs. 3, 4 and 5. are views in detail of portions of the same.

The objects of this invention are: First, to construct a trussed vehicle axle, in such shape as to secure the maximum lightness consistent with the strength required, and at the same time the utmost rigidity possible both vertically and laterally. Second, to so construct the ends of the axle that the spindle portion thereof can be removed and adjusted at different heights as may be desired. The first of these objects I accomplish by constructing the axle of three arched sections, the two upper sections, of which are on the same plane, while the third and lower one, forms the apex of an inverted triangle, these three sections being arranged and braced together as hereinafter more specifically described. The second of these objects I accomplish by making a series of holes in the end sections of the axle in which the spindles may be secured, as hereinafter more particularly described.

In the construction of my improved vehicle axle, shown in the drawings A, B, and C, are the three arched sections thereof, and they may be made of either wood or metal, the two upper sections A and B are of equal radius, and on the same plane, gradually approaching each other at the ends until they join and are secured to the portions D, E, of the end sections F, of the axle, while the third and lower section C has its radius so flattened at the center of the arch, that it is at that point some distance centrally below the sections A, B, from which point it gradually approaches the upper sections A, B, until it is secured into the portion G, of the end section F, of the axle. These sections A, B and C, I secure together by means of tie braces H, I, and J, these braces forming the three sides of a triangle, each set of which gradually diminishes in length, as the ends of the axle are approached.

The end sections F, of the axle, I provide with openings L one above the other adapted to receive the inner ends of the spindles M, upon which the wheels N N of the vehicle are mounted, which spindles are secured therein preferably by means of nuts O, so that they together with the wheels N thereon can be removed, and adjusted up or down on, the ends of the axle as desired.

I have shown a sulky axle in the drawings as illustrative of my invention, I can however utilize my improved axle in other vehicles as desired.

Having thus fully described my invention so as to enable others to construct and use the same, what I claim as new and desire to secure by Letters Patent of the United States is:

1. A vehicle axle, consisting substantially of three semicircular or arched sections, two of which are on the same horizontal plane, and the third centrally below them, the ends of which are secured together in metal sections, adapted to receive and support removable wheel spindles, and the central portion thereof by means of braces, substantially as and for the purpose set forth.

2. The combination in a vehicle axle, of a central arched portion consisting of sections A, B, and C, secured together centrally by braces H, I, and J, with sections F, secured to the ends of said central arched portion, and removable spindles, adapted to be adjusted up and down in the end sections F, substantially as and for the purpose set forth.

In testimony whereof I affix my signature in presence of two witnesses.

JAMES W. VAUGHN.

Witnesses:
F. EINFELDT,
JOHN S. RILLING.